United States Patent [19]

Spencer

[11] 4,299,200
[45] Nov. 10, 1981

[54] APPARATUS AND METHOD FOR COLLECTING SOLAR ENERGY

[75] Inventor: Donald L. Spencer, Iowa City, Iowa

[73] Assignee: University of Iowa Research Foundation, Iowa City, Iowa

[21] Appl. No.: 859,619

[22] Filed: Dec. 12, 1977

[51] Int. Cl.³ .............................................. F24J 3/02
[52] U.S. Cl. .................................. 126/434; 126/437; 126/445
[58] Field of Search ............... 126/271, 270, 434, 432, 126/444, 419, 437; 237/1 A; 165/171, 128, 170, 166; 137/563

[56] References Cited

U.S. PATENT DOCUMENTS

| | | | |
|---|---|---|---|
| 705,350 | 7/1902 | Hubert | 126/444 X |
| 1,101,001 | 6/1914 | Willsie | 126/271 X |
| 1,209,956 | 12/1916 | Gesell | 126/271 X |
| 2,626,130 | 1/1953 | Raskin | 165/170 |
| 2,636,129 | 4/1953 | Agnew | 126/271 X |
| 3,369,539 | 2/1968 | Thomason | 126/271 |
| 3,759,323 | 9/1973 | Dawson et al. | 165/166 |
| 3,919,998 | 11/1975 | Parker | 126/271 X |
| 3,991,937 | 11/1976 | Heilemann | 126/271 X |
| 3,995,615 | 12/1976 | Hojnowski | 126/271 |
| 4,002,200 | 1/1977 | Raskin | 165/170 X |
| 4,008,709 | 2/1977 | Jardine | 126/271 |
| 4,010,734 | 3/1977 | Chayet | 126/271 |
| 4,036,209 | 7/1977 | Press | 126/271 |
| 4,038,965 | 8/1977 | Lyon | 126/271 |
| 4,038,970 | 8/1977 | D'Ascoli et al. | 126/271 |
| 4,044,949 | 8/1977 | Morawetz et al. | 237/1 A |
| 4,047,518 | 9/1977 | Anderson | 126/271 |
| 4,048,981 | 9/1977 | Hobbs | 237/1 A X |
| 4,050,508 | 9/1977 | Buckley | 126/434 X |

FOREIGN PATENT DOCUMENTS

| | | | |
|---|---|---|---|
| 2413225 | 7/1975 | Fed. Rep. of Germany | 126/271 |
| 28273 | of 1910 | United Kingdom | 126/444 |

*Primary Examiner*—Samuel Scott
*Assistant Examiner*—Randall L. Green
*Attorney, Agent, or Firm*—Beveridge, DeGrandi, Kline & Lunsford

[57] ABSTRACT

An absorber panel for solar energy is formed of two sheets with spacer means extending therebetween to maintain a spaced relationship between the sheets and provide a flow passage for a heat exchange liquid such as water. A pressure differential biases the sheets toward each other so that their spacing is maintained by the spacer means. The upper sheet which is exposed to solar energy may be thin, and the sheets are free to move away from each other at the location of the spacer means so that permanent damage will not result when the heat exchange liquid expands by freezing or when there is excessive flow of liquid through the flow passage in the absorber panel.

16 Claims, 10 Drawing Figures

APPARATUS AND METHOD FOR COLLECTING SOLAR ENERGY

BACKGROUND AND SUMMARY OF THE INVENTION

This invention relates to methods and apparatus for utilizing solar energy in systems which have solar collector assemblies with absorber panels through which a heat-receiving liquid is circulated. Systems of this general type are well-known, but are subject to certain disadvantages which have been recognized by persons working in this field.

Most absorber panels are expensive since they must be made of a material which has good thermal conductivity and possesses sufficient strength to hold pressurized liquid.

When prior absorber panels have been made of materials of sufficient strength to withstand normal system operating pressures and to provide sufficient thermal conductance, the thickness of the material adds an expense to the system and adds to the thermal capacity and warmup time.

Some prior absorber panels have been constructed of sheets which are bonded together at spaced-apart locations, to provide a flow passage formed of laterally spaced segments. Such an arrangement is undesirable in several respects. First, the heat from solar energy which strikes the areas of the absorber panels between the flow passage segments must be conducted laterally in the panel to the heat exchange liquid in the flow passage.

Portions of the absorber panel are at temperatures which are higher than the temperature of the heat-exchange fluid, resulting in undesired losses of heat from the collector assembly. A further disadvantage of this prior construction is that the bonding together of the adjacent sheets leaves them susceptible to damage from distension or rupture when there is excessive flow through the absorber panel or when the flow passage is expanded due to freezing of the liquid therein.

Many prior systems provide flow passages which are filled by a layer of air and a layer of water or other heat exchange liquid. In these systems, the optimum transfer of heat to the heat exchange liquid is not possible since the upper sheet is insulated from the liquid by the air which is present in the flow passage. If the top layer of the passage is transparent, condensation of water vapor occurs on the passage surface thus reducing its transmittance.

The present invention includes a number of concepts specifically set forth in the claims below. These concepts when combined and sometimes when taken alone, avoid one or more of the aforementioned shortcomings of the prior art.

One feature of the present invention is the presence of a minimum pressure differential across the sheets which form the absorber panel. Preferably, this is achieved by the utilization of a circulatory system which causes the heat exchange fluid to flow through the flow passage in the absorber panel at a sub-atmospheric pressure. Such a circulatory system may involve an evacuated reservoir located above the inlet end of the absorber panel, a reservoir connected to the absorber panel by means such as an orifice or pipe of dimensions to produce a pressure drop resulting in negative pressure, or a reservoir at atmospheric pressure which is in communication with and at a lower elevation than the inlet end of the absorber panel.

Another feature of the invention is the use in a liquid-filled system of spacer means between the sheets which form the absorber panels, the spacer means serving to maintain a spaced relationship between the sheets when the pressure differential across the sheets tends to bias them toward each other. When the spacers are small, the flow through the absorber panel is substantially equivalent to flow between parallel plates, avoiding any significant lateral thermal conduction in the absorber panel. When the sheets are unbonded at the spacer means, they are free to move apart to avoid permanent damage to the absorber panel in the event the sheets are forced apart by thermal expansion or system malfunction.

Many of the objects of this invention are realized as a direct result of one or more of the features described above. One such object is to permit the use of economical absorber panels made of relatively thin sheets of material. This represents a substantial saving, particularly in absorber panels which are made of copper or other corrosion-resistant materials.

Another object of the invention is to provide an uncomplicated and relatively maintenance-free circulatory system.

Still another object of the invention is to provide a system which is highly efficient to provide maximum utilization of the solar energy. Many features of the invention contribute to this. According to most preferred embodiments, the flow passage extends substantially across the total area of the absorber panel. The use of thin materials and the avoidance of substantial lateral separation between the portions of the flow passage causes all parts of the sheet exposed to solar energy to remain at a temperature approximately equal to that of the heat exchange fluid, thereby reducing the loss of heat due to radiation and convection from the absorber panel. The efficiency is also improved by having the single-phase flow of liquid which excludes air or other gases from the flow passage.

A further object of the invention is to provide a durable system. The absence of a positive connection between the sheets at the spacer means renders the absorber panel resistant to freeze damage.

BREIF DESCRIPTION OF THE PREFERRED EMBODIMENTS

As in many prior solar systems for heating water, the present invention utilizes a collector having an absorber panel through which a liquid such as water is circulated by means of a circulatory system. To optimize efficiency of heat transfer, air is excluded from the system, so that the circulating water in the absorber panel is in direct contact with the interior surface of the absorber plate which is exposed to solar radiation.

Figure 1:
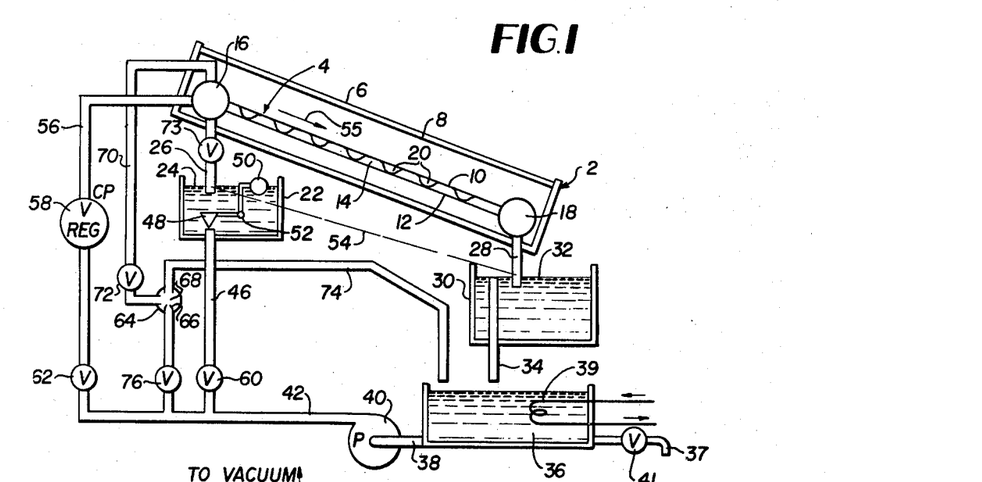
FIG. 1 is a diagramatic view of one system which embodies many of the concepts of the invention.

Referring to FIG. 1, it will be seen that a collector assembly is formed of an enclosed housing 2 which contains an absorber panel assembly 4. The exposed face of the housing 2 is provided with a pair of spaced-apart transparent sheets 6 and 8 which permit radiant solar energy to strike the absorber panel assembly 4 and supress convective and radiant heat losses from the housing 2. The sheets 6 and 8 may be formed of glass or other transparent materials provided with coatings which optimize the transmission of solar energy into the housing and resist radiant heat losses from the housing. According to well-known practices in this field, the sides and rear of the housing may be formed of thermal insulating material to prevent unnecessary conductive heat losses.

The solar absorber panel is formed of a pair of substantially parallel sheets 10 and 12 which have their mutually-confronting interior surfaces spaced apart to provide a flow passage space 14 through which the heat-receiving liquid is circulated. It is preferred that these sheets are planar, but they may have other shapes to provide an absorber panel of simple or compound curvature. The longitudinal edges of the sheets are bonded together, and their transverse upper edges are bonded and sealed to the tubular upper header 16 which serves as the collector inlet means. In a similar fashion, the transverse lower edges of the sheets 10 and 12 are bonded and sealed to the transverse tubular lower header 18 which is the outlet means for the absorber panel assembly 4. The headers may be formed in the sheets.

Preferably, the sheet 10 exposed to solar radiation is formed of copper, stainless steel or another creep-resistant material which has a good resistance to corrosion. However, this sheet 10 may also be made of a frangible material such as glass due to its exposure to a rather small pressure differential as described below. The lower sheet 12 may be made of thicker and less expensive materials suitable for fabrication into the absorber panel. This sheet 12 may even be made of a laminated or homogeneous thermal insulating material.

The thickness of the flow passage space 14 is determined by the height of a series of dimples 20 which are integral with and raised from the upper sheet 10 by a conventional embossing process. The size of the dimples 20 is greatly exaggerated in FIG. 1, and their number is reduced only for illustrative purposes. Copper or stainless steel sheets of this type are commercially available. The dimples serve as spacer means, but they preferably are not bonded to the lower sheet 12, thus simplifying manufacture and enabling the sheets to move apart when there is a need for expansion of the flow passage space 14, such expansion being desirable when the heat-receiving fluid expands due to freezing or when there is excessive flow through the flow passage space during system startup or as a result of system malfunction. Freeze damage to the headers 16 and 18 may be avoided by locating them in a warmer area, as inside the insulation of a home, or by placing a contractible air-filled body inside the headers.

During normal operations of the system, the spacers 20 are in contact with the interior surface of the lower sheet 12 to establish the thickness of the flow passage space 14.

The contact between the spacer means 20 and the lower sheet 12 is attributable to the circulatory system which introduces liquid into the upper header 16 of the absorber panel assembly 4 at subatmospheric pressure. A slight vacuum in the flow passage space 14 tends to bias the sheets 10 and 12 together, bringing the spacers 20 into contact with the lower sheet 12 so that the thickness of the flow passage space 14 is established by the spacer means. A possible but less practical method of establishing a pressure differential between the space 14 and the exterior surface of the upper sheet 10 would be to introduce a slight pressure to the interior of the housing 2.

The circulatory system illustrated in FIG. 1 is designed to establish subatmospheric liquid pressure at the upper header 16. The subatmospheric pressure is preferably not excessive, on the order of not more than about two feet of water less than atmospheric pressure. To achieve this, a supply conduit extends downwardly from the absorber inlet header 16, and means are provided to create atmospheric pressure in the fluid in the supply conduit at an elevation below the absorber inlet header 16. The effect of the column of water in the supply conduit will result in subatmospheric pressure at the header 16.

Two alternative systems for creating atmospheric pressure in the liquid in such a supply conduit are shown in FIG. 1. One such system calls for an upper liquid supply reservoir 22 which contains a body of the circulating liquid having its liquid surface 24 at atmospheric pressure. The supply conduit 26 which extends downwardly from the inlet header 16 into the body of liquid in the upper reservoir 22 will inherently be at atmospheric pressure at the elevation corresponding to that of the liquid surface 24. Of course, at the header 16 which lies above that elevation, the liquid will be at subatmospheric pressure.

In a similar manner, the liquid in the outlet header 18 for the absorber panel assembly 4 is maintained at subatmospheric pressure. In FIG. 1, the discharge conduit 28 leads from the outlet header 18 to a submerged area in a body of water contained in the liquid-receiving reservoir 30. The liquid level 32 in the reservoir 30 is established by the overflow pipe 34 which discharges into a storage reservoir 36. Heated liquid may be drawn from the reservoir 36 through the outlet pipe 37 which is provided with a valve 41. The heated liquid in reservoir 36 may also be exposed to heat exchange coils 39, through which potable water or home heating water is circulated.

The circulatory system also includes means for returning liquid from the storage reservoir 36 to the upper liquid supply reservoir 22. In the illustrated embodiment, this comprises a conduit 38, recirculating pump 40, delivery conduit 42 and vertical conduit 46, the outlet end of which is obstructed by a float-controlled valve 48. The valve 48 is connected to a float 50 by a rigid Z-arm which is pivotally supported at 52. As the water level rises, the float 50 produces pivotal movement of the Z-arm about support 52, moving the valve 48 into sealing engagement with the upper end of the vertical conduit 46. Of course, many other means may be used for establishing the liquid level 24 in the upper liquid supply reservoir 22. Various types of float-control valves may be used, a float-controlled pump may be substituted for the pump 40 or there may be continuous spillover from an overflow pipe leading from the reservoir 22 back to the storage reservoir 36.

In the gravity syphon system which has just been described, it is important that the elevation of the liquid level 24 of the upper liquid supply reservoir 22 lie somewhere between the elevation of the inlet header 16 and the elevation of the liquid level 32 in the lower reservoir 30. When this condition is satisfied, the system will move liquid in the direction of arrow 55 through the absorber panel assembly 4, regardless of the extent or direction of inclination of the absorber panel assembly 4. For example, the absorber panel assembly 4 may be horizontal, or the outlet header 18 may be at a higher elevation than the inlet header 16. The latter, however, is not preferred because it would result in a substantial change in pressure as the liquid flows through the absorber panel assembly 4. As the liquid approaches an elevated outlet header, the vacuum or negative pressure will be significantly greater than in the vicinity of a lower inlet header, possibly requiring fabrication of the absorber panel assembly of heavier and more expensive materials capable of withstanding the higher negative pressures.

An ideal system constructed according to the invention will maintain a piezometric head line in the liquid throughout its passage that is parallel to the plane of the absorber panel. The piezometric head is the sum of static gauge pressure and elevation. This will require that the inlet header be at a higher elevation than the outlet header. It also requires consideration of the principles of hydrodynamics, as there will be pressure losses attributable to turbulence and fluid friction as the liquid traverses the length of the absorber panel. These losses are dependent on a number of well-known factors including the viscosity of the circulating liquid and the size and configuration of the flow passage space between the sheets of the absorber panel. In a properly-adjusted system, the hydrodynamic losses along along the length of the flow passage in the absorber panel are equal in magnitude to the change in elevation (potential energy of flow) which results from the downward inclination of the absorber panel. When this is achieved, the piezometric head line will be substantially parallel to the absorber panel so that the materials forming the absorber panel assembly will be subjected to substantially the same stresses. When the flow passage space has an ideal transverse configuration, this slope in the piezometric head line is realized by having the heat-receiving fluid flow downwardly through the flow passage 14 of the absorber panel, at an inclination approximating the inclination of a line 54 which extends between the point of atmospheric pressure in fluid supply conduit 26 and the point of atmospheric pressure in the fluid discharge conduit 23.

An alternative form of gravity syphon system is also shown in FIG. 1 and may be used in lieu of the system with the liquid supply reservoir 22. According to this alternative arrangement, a liquid supply conduit 56 extends upwardly from the delivery conduit 42 to the inlet header 16 of the absorber panel assembly. A pressure regulator 58 has a constant positive outlet pressure which is less than the pressure head resulting from the column of liquid between the regulator 58 and the inlet header 16. The pressure regulator 58 may be replaced by a flow rate regulator, which provides a constant outlet flow rate. Such devices are well known, and are commercially available. Such an arrangement inherently results in subatmospheric pressure at the inlet header 16, thus causing the liquid in the flow passage space 14 to be at subatmospheric pressure, biasing the sheets 10 and 12 toward each other so that the spacers 20 establish the thickness of the flow passage space 14.

Although the fluid supply system using the upper reservoir 22 has been presented as an alternative to the system which utilizes the pressure regulator 58, it is possible to include both in a single system as shown in FIG. 1. When this is done, it is, of course, necessary to provide appropriate valves 60 and 62 to select which of the fluid supply systems is to be used for furnishing subatmospheric liquid to the inlet header 16 of the absorber panel assembly 4.

When the system of FIG. 1 is first put into operation, the flow passage space 14 and the headers 16 and 18 will be filled with air so that gravity syphon flow cannot occur. In order to remove air and to introduce liquid into the system, it is desirable to draw a vacuum at the inlet header 16, either by means of a conventional vacuum source or by an ejector system such as the one illustrated in FIG. 1. The ejector system has a jet pump 64 provided with a nozzle 66 which releases a stream of liquid from the pump 40 into the chamber 68 to create an area of reduced pressure. A vacuum conduit 70 with a valve 72 extends from the chamber 68 to the inlet header 16 of the absorber panel assembly. Liquid from the nozzle 66 returns to reservoir 36 through a return line 74.

When starting the system, the reservoirs 22 and 30 are filled to their normal operating levels. The jet pump 64 is activated by opening the valves 76 and 72. Valve 73 in conduit 26 is closed. The jet pump 64 pulls a vacuum in the vacuum conduit 70 and in the inlet header 16 of the absorber panel assembly 4. This draws liquid upwardly from the reservoir 30 into the inlet header 16 and, from that point, through the suction conduit 70 to the jet pump 64. During this operation, care should be taken to avoid permanently deforming the plates 10 and 12 by excessive vacuum in the flow passage 14. Immediately after shutting down the jet pump 64 and simultaneously opening valve 73, reversal of the liquid flow direction occurs in the flow passage 14. The pressure assumes its slightly negative condition whereupon the dimple spacers 20 establish the thickness of the flow passage space 14.

Figures 2, 3:
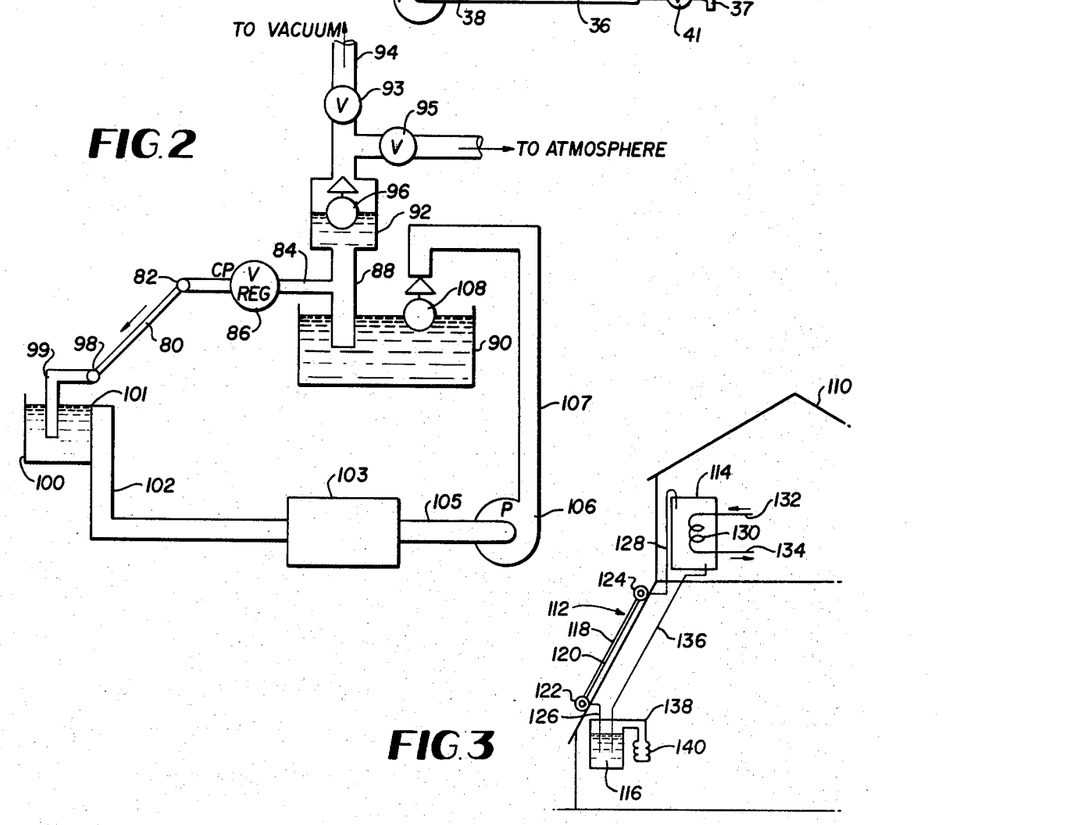
FIG. 2 illustrates diagramatically another system constructed according to the invention, in which a vacuum source is used in connection with the circulatory system.
FIG. 3 shows a further embodiment of the invention wherein a thermosyphon circulatory system is used for residential water heating.

FIG. 2 shows another form of gravity syphon system. In this arrangement, the liquid fed to the upper header is continuously in communication with a vacuum source which provides assurance against the inclusion of air in the system. The absorber panel 80, shown schematically, has an inlet header 82 which is fed by a supply conduit 84 provided with a pressure regulator 86. The supply conduit 81 receives liquid from a standpipe 88 which has its lower end submerged in a body of water in an upper liquid supply reservoir 90 and its upper end terminating in a vacuum reservoir 92 which, during normal operation, communicates via normally-open valve 93 with a conduit 94 connected to a vacuum pump or other vacuum source (not shown). The vacuum reservoir 92 may be connected to atmosphere by opening the normally-closed valve 95, as when the system is being shut down. A float valve 96 prevents overflow of liquid in the vacuum reservoir 92.

The effect of the vacuum reservoir 92 is to provide an adequate supply of liquid to the supply conduit 84, thus avoiding the possibility that an air will be drawn into the system during normal operations.

After passing through the absorber panel 80, the liquid enters the lower header 98 and then is carried by a discharge conduit 99 to the lower liquid-receiving reservoir 100. The body of liquid in this reservoir 100 will spill over the lip 101 into a recirculating conduit 102 and storage vessel 103.

In the embodiment of FIG. 2, subatmospheric pressure is established in the discharge conduit 99 due to its elevation above the surface of the liquid in reservoir 100. The immersed lower end of the discharge conduit 99, together with the lip 101, serve as a loop seal preventing the entry of air into the discharge conduit 99 and the lower header 98.

Liquid in the system of FIG. 2 is recirculated to the upper reservoir 90 by means of a conduit 105, pump 106 and conduit 107, the discharge end of which cooperates with a float valve 108 to prevent overflow of the upper liquid supply reservoir 90.

Although it is preferred in most cases that the heat exchange liquid flow downwardly through the collector, as described in connection with FIGS. 1 and 2, there are some systems where upward flow through the collector is utilized. A system of the latter type is illustrated in FIG. 3 which shows a residential water heating system which circulates the water on a thermosyphon principle.

Thermosyphon systems are well known. They operate by providing a liquid circulation loop wherein one vertical leg includes a collector exposed to a given amount of solar energy and another vertical leg exposed to less solar energy than the collector. Exposure of the collector leg to solar energy causes expansion of the heat-receiving liquid. Therefore, the liquid in the collector leg has a lower density than the liquid in the recirculation leg of the loop, causing the liquid to flow upwardly in a known manner through the collector.

Earlier thermosyphon systems for residential water heating are operated at the water system line pressure. Absorber panels subjected to such pressures must be made of relatively thick, rigid materials able to withstand these pressures. In contrast to this, the present system is designed to have the liquid pressure in the absorber panel at subatmospheric pressures, again tending to bias the two sheets which form the absorber panel toward each other.

As shown in FIG. 3, the residence 110 has an absorber panel 112 lying in a flow path between an upper heat exchanger 114 and a lower fluid supply reservoir 116. The absorber panel 112 is formed of two plates 118 and 120 which define therebetween a flow passage which is in communication with the lower inlet header 122 and the upper outlet header 124. A collector feed line 126 extends from the fluid supply reservoir 116 to the inlet header 122; and, a collector discharge line 128 leads from the absorber panel outlet 124 to the heat exchanger vessel 114 which is illustrated diagramatically. Coils 130 are located in the heat exchanger vessel 114 which receives unheated water through inlet 132 and discharges heated potable or home-heating water through the outlet 134. In operation, the water from the absorber panel 112 is carried by thermosyphon action through the collector discharge line 128 and into the vessel 114 where the heat acquired is transferred to the water.

After giving off its heat to the water in coils 130, the recirculating water descends through a recirculation line 136 to the fluid supply reservoir 116.

The upper space within the fluid supply reservoir 116 is maintained at atmospheric pressure. Although sealed from the atmosphere, this space is connected by a line 138 to a sealed, expansible bellows 140, the exterior of which is in communication with the atmosphere. In this manner, liquid in the reservoir 116 cannot evaporate or be contaminated by the surrounding atmosphere, but the surface of the liquid within reservoir 116 is always at atmospheric pressure.

Since the absorber panel 112 is located at a higher elevation than the liquid level in reservoir 116, it will be evident that the flow passage within the absorber panel 112 will be at subatmospheric pressure. This establishes a pressure differential tending to bias the two sheets 118 and 120 toward each other. Spacer means limit such motion to preserve the flow passage space.

Figures 4, 5, 6:
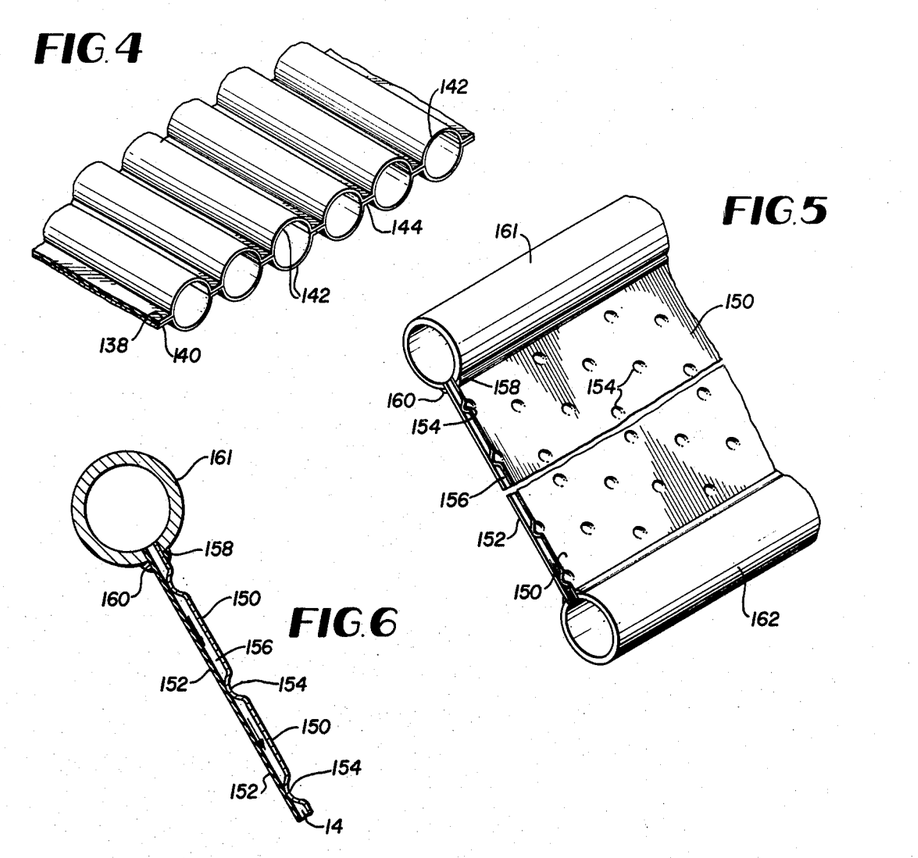
FIG. 4 shows segments of sheets which are suitable for use in connection with thermosyphon systems of FIG. 3.
FIGS. 5 and 6 show, respectively, a perspective and an enlarged sectional view of portions of an absorber panel of general applicability, suitable for use in connection with the embodiments of FIGS. 1 and 2.

An upflow thermosyphon system designed according to FIG. 3 cannot have a negative pressure which is substantially equal from the inlet header 122 to the outlet header 124. For example; if the pressure in inlet header 122 is an infinitesimal amount below atmospheric pressure, the negative pressure at the outlet header 124 will be substantially equal to the height of the water column between the headers 122 and 124. The higher negative pressure in the area of the upper header 124 will require a different configuration or heavier material for the sheets 138 and 140 than in the systems where the pressure is substantially equal from the inlet header to the outlet header. An appropriate absorber panel for a negative pressure thermosyphon system is shown in FIG. 4 where sheets 138 and 140 are formed with longitudinal ridges which, in cross section, are semi-circular as shown at 142. Flat areas 144 serve as the spacer means tending to limit the movement of the sheets 138 and 140 toward each other. In the arrangement of FIG. 4, the spacer means 144 are considerably greater in area than that in collectors where there is no significant pressure differential along the length of the collector. In the FIG. 4 collector, the sheets preferably are not bonded together in the area of the spacers 144. This provides a very important advantage in the event of freezing weather since the liquid in the collector 112 may freeze and expand, moving the sheets 138 and 140 apart. The absorber panel is not permanently damaged by such expansion due to freezing, inasmuch as there are no bonded areas at the spacer means 144. The configuration of FIG. 4 is preferred to that of FIG. 5 for thermosyphon systems in order to reduce the flow resistance in the absorber panel.

The specific construction of absorber panels according to the invention may vary widely. A preferred form suitable for most negative pressure installations is illustrated in FIGS. 5 and 6 which show the absorber panel formed of a pair of plates 150 and 152 which are substantially parallel. The plate 152 has a plurality of dimples 154 embossed therein which serve as spacer means for establishing the thickness of the flow passage 156 between the plates. The thickness of sheet 150 is no greater than about 0.01 inch. The longitudinal edges of the sheets 150 and 152 are sealed together directly, and their upstream ends are bonded at 158 and 160 to an inlet header 161. The downstream transverse ends of plates 150 and 152 are similarly bonded to the outlet header 162. The headers 161 and 162 may be formed integrally of the sheets 150 and 152. It has been found that the preferred height of the dimples, and thus the thickness of the flow passage between the plates for gravity syphon systems, is no greater than about 0.04 inch, preferably lying in the range of about 0.028 to 0.040 inch. The spacing between adjacent dimples is preferably in the range of about ⅜ to ½ inch.

The absorber panel may also be formed of substantially parallel sheets formed of 304 or 444 stainless steel 0.15 mm (0.006 in.) thick, seam welded together around their perimeters to provide a fluid flow passage for a heat exchange fluid. The lower sheet is planar. The upper sheet is blackened and possesses a sinusoidal deep texture pattern in which integral raised projections serve as spacers to establish the thickness of the flow passage space when the liquid flowing through the panel is at subatmospheric pressure. Suitable textured sheets designated 6-WL are available from Rigidized Metals, Inc., Buffalo, N.Y. In such sheets, there are about 2.8 projections per square centimeter, and the depth from the bottom of the depressions on one side to the top of the projections on the same side is 0.7 mm (0.030 in.). This provides a flow passage having a mean thickness of 0.38 mm (0.015 in.) and a maximum thickness of 0.76 mm (0.030 in.).

Figure 7:
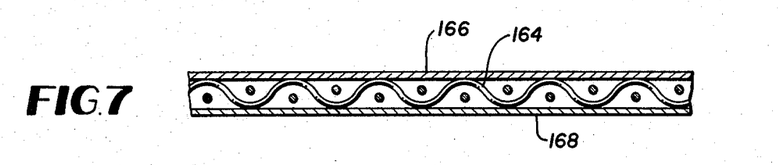
FIGS. 7 and 8 are segments of the sheets and spacer means for alternative types of absorber panels.

Rather than using spacer means integral with the sheets, it is possible to use separate and discrete spacers or a continuous spacer such as the screen wire foraminous member 164 illustrated in FIG. 7. In all cases, the spacer means serves to prevent the sheets 166 and 168 which define the flow passage space from moving too closely together and thus constricting the flow passage when the absorber panel is operating normally under subatmospheric conditions.

Figure 8:
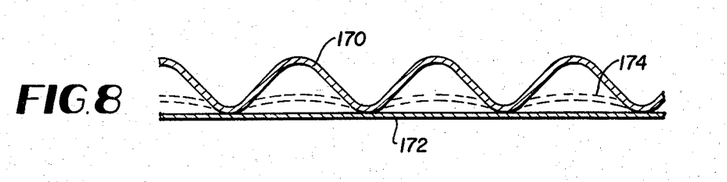

The absorber panel shown in FIG. 8 is formed of one planar sheet 170 and one corrugated sheet 172. The corrugations extend longitudinally from the inlet header to the outlet header, and the peaks of the corrugations contact the planar sheet 170 to serve as the spacer means.

Systems constructed according to the invention may be tuned and adjusted by changing the inclination of the absorber panel or by varying the transverse size and shape of the flow passage in the absorber panel. If necessary, the flow passage size may be varied by subjecting the liquid in the absorber panel to excessive negative pressures, deforming one or both of the sheets inwardly beyond their yield point where they will take on a permanent set as shown by the broken line 174 as shown in FIG. 8.

From the foregoing description, it will be apparent that many important advantages are attributable to the features of this invention. Uncomplicated means have been shown for providing a negative pressure in an absorber panel flow passage. This negative pressure simplifies absorber panel fabrication by enabling the use of spacers raised from one or both of the absorber panel sheets, and avoiding the necessity of bonding the absorber panel sheets at numerous spaced intervals. The absence of such bonding enables the absorber panel sheets to be forced apart by adverse conditions without being damaged. When the negative pressure is small, the absorber panel sheets may be thin or fragile materials which otherwise are unsuitable for absorber panel construction. The absorber panel may be formed to provide a negligible amount of lateral heat conduction in the sheets.

Effective conduction of heat to the circulating liquid is promoted by the circulatory system which fills the absorber panel with liquid, to the exclusion of air or other gases which impede heat transfer.

Figure 9:
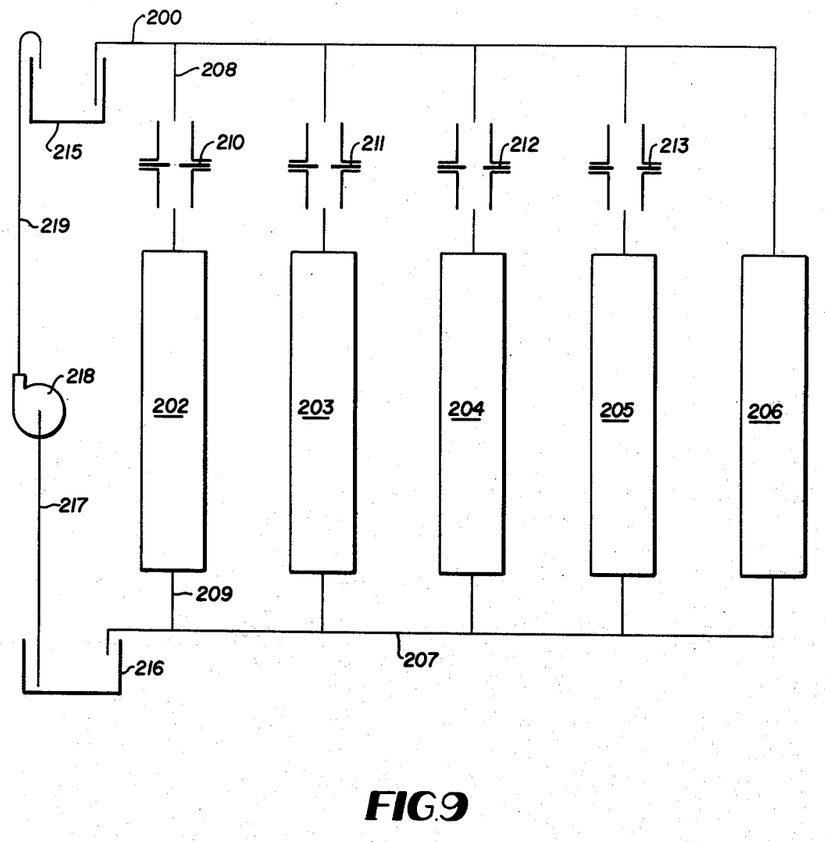
FIG. 9 is a diagramatic view of a system utilizing a plurality of absorber panels, wherein orifices reduce the pressure at the upstream inlet headers to enable each of the absorber panels to operate at a substantially constant piezometric pressure.

In some installations, it will be desirable to maximize the amount of collector surface by connecting in parallel a plurality of absorber panels of the type described above. Such an arrangement is shown in FIG. 9 which shows an inlet manifold line 200 feeding a plurality of absorber panels 202–206, each of which may be constructed as described above. The outlet headers of absorber panels 202–206 are connected by branch lines to the outlet manifold line 207.

As the liquid flows along the length of the inlet manifold 200, normal pressure losses will result so that the pressure will diminish progressively in a downstream direction. Similarly, the pressure in the outlet manifold line 207 will decrease and become more negative in the downstream direction. Therefore, the highest pressure available to an absorber panel from the inlet manifold line 200 is at the branch line 208 leading to the absorber panel 202; and, the lowest pressure leading from the outlet manifold line 207 to an absorber panel will be in the branch line 209 which also leads to the absorber panel 202. Of course, this condition is undesirable as it would create excessive pressure differentials across the absorber panels which have both upstream inlets on inlet manifold line 200 and downstream outlets on outlet manifold line 207. This would prevent operation of many absorber panels under the desired conditions of constant negative pressure. To avoid this undesirable condition, secondary flow regulating means are required. In FIG. 9, this is provided by orifice plates positioned in the branch lines leading from the inlet manifold line 200 to the absorber panels 202–205. The orifice plates are designated 210–213, and their orifice sizes will increase progressively, the smallest being at 210 and the largest being at 213. Careful selection of the orifice sizes will result in a pressure pattern in which the inlet header pressure of the absorber panels increases progressively in a downstream direction, which is the converse of the condition which would occur in the absence of the orifice plates 210–213. Moving from left to right in FIG. 9, both inlet pressures and outlet pressures will increase progressively along the array of absorber panels, becoming less negative from left to right.

The source of liquid to the inlet manifold line 200 is an upper reservoir 215, the liquid level of which may be higher than the absorber panels if the pressure losses along the inlet manifold line 200 and/or across the orifice plates 210–213 is such that a negative pressure will exist at the inlet headers of all absorber panels. Liquid from the absorber panels is carried by the outlet manifold line 207 to a lower reservoir 216, this liquid then being circulated upwardly by a recirculation system which includes a suction line 217, pump 218 and delivery line 219 which discharges into the upper reservoir 215.

Figure 10:
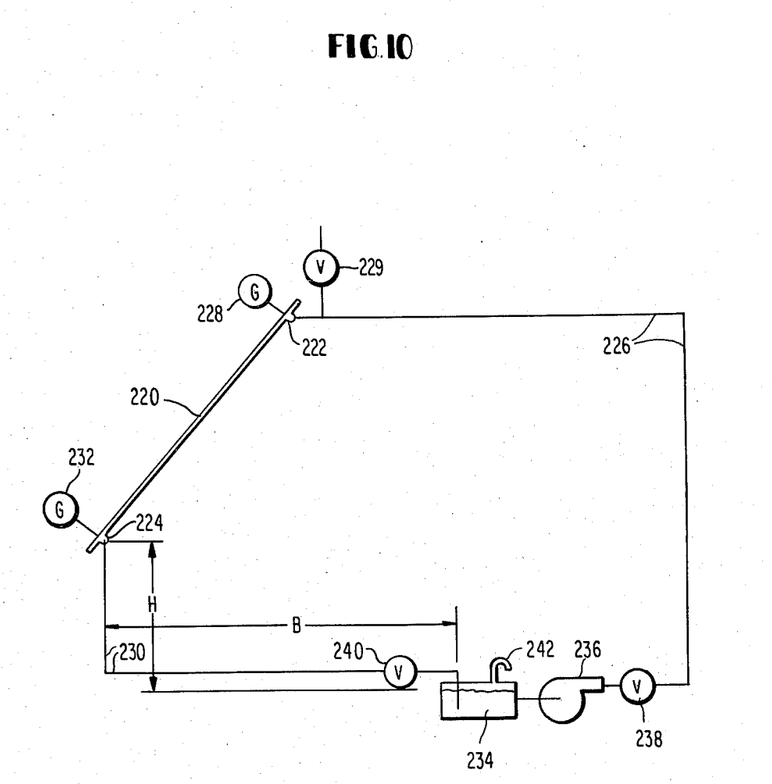
FIG. 10 is a schematic flow diagram of a preferred circulatory system used in connection with the invention.

FIG. 10 shows an improved presently preferred circulatory system wherein a pump and supply conduit leading to the absorber panel are the means for creating atmospheric pressure in the supply conduit at an elevation below the collector inlet.

As shown in FIG. 10, the inclined absorber panel 200 has an inlet header 222 and an outlet header 224. A supply line 226, an inlet pressure gage 228 and a solenoid-operated vent valve 229 are connected to the inlet header 222; and, an outlet line 230 and an outlet pressure gage 232 are attached to the outlet header 224. Liquid from a reservoir 234 is delivered by a centrifugal pump 236 to the supply line. The pressure in the supply line 226 diminishes progressively along its length due to elevational changes and viscous losses. This pressure is initially positive, becomes atmospheric at a point in line 226 which is below the elevation of the absorber inlet header 222, and then becomes negative upstream of the absorber inlet header 222. A manually adjustable throttling valve 238 may be positioned in the supply line 226 for adjusting the negative pressure delivered to the header 222.

The circulating liquid remains at negative pressure, preferably a substantially constant negative pressure, throughout its movement through the absorber panel 220 where it is heated by solar radiation. Outlet line 230 returns the liquid through a manually adjustable throttling valve 240 to the reservoir 234, the immersed end of line 230 providing a loop seal, leading the returning liquid downwardly to a submerged area in the reservoir 234 where the pressure is slightly greater than atmospheric pressure. The returned liquid then flows upwardly to a loop seal discharge point, the surface of the reservoir, which is below the outlet header 224 and is kept at atmospheric pressure by the provision of a vent 242.

When the system of FIG. 10 is initially installed, adjustment is required to provide it with the desired flow characteristics. In this procedure, the centrifugal pump 236 is turned on and solenoid vent valve 229 is automatically closed. As the pressure head produced by a centrifugal pump increases when the flow rate decreases, the pump 236 is quite capable of producing sufficient flow through line 226 to absorber panel inlet 222 during startup. As flow begins, air is swept from the flow passage in absorber panel 220 and outlet line 230.

With liquid circulating through the system, the valves 238 and 240 are alternately adjusted until the proper levels of negative pressure are indicated by the gages 228 and 232. Adjusting valve 238 changes the flow rate to change the pressure indicated by the gage 228. The valve 240 must never be closed beyond a position which gives the desired vacuum at full flow. In a system in which the mean thickness of the flow passage through absorber panel 220 is about 0.014 inch, the vacuum at gage 228 is set at about two feet of water and the vacuum at gage 232 is set at about four feet of water, producing a flow rate of about one gallon per minute for an absorber panel inclined at 60° and having a width of four feet and an inclined length of ten feet.

In some situations, it may be possible to use flow control orifices or pipes of suitable size and shape to provide suitable flow characteristics in the system. However, the use of valves is preferred as it gives the system greater versatility. In any case, however, the outlet line 230 should be small enough that air is entrained out of it by the flowing liquid. An appropriate size may be determined from tables or graphs which indicate the sizes to be used for ratios of the measurements H to B indicated on FIG. 10.

Before placing the system in normal operation, the gages 228 and 232 are removed. Thermostatic controls simultaneously activate the pump 236 and close the vent valve 229, circulating water at subatmospheric pressure through the absorber panel and displacing air from the absorber panel and outlet line 230. When the temperature differential between the absorber panel 220 and the water in reservoir 234 diminishes to a predetermined level, the pump is deactivated and the vent valve 229 opens to enable liquid to drain from the system. When this temperature differential increases, the pump 236 is activated, vent valve 229 is closed, causing water to circulate through the system where it maintains subatmospheric pressure within the absorber 220.

The advantages described in this specification are realized by following one or more of the principles disclosed above. Such principles may also be incorporated into systems which differ from the preferred described embodiments. Accordingly, it is emphasized that the inventive concepts are not limited only to the described embodiments, but may take other forms which are within the scope and spirit of the claims which follow.

I claim:
1. A solar collector system, comprising,
a pair of substantially parallel sheets which have interior and exterior surfaces, said interior surfaces facing each other and being spaced apart to provide therebetween a flow passage space,
spacer means for limiting the movement of said sheets toward each other, and
means for maintaining a pressure differential between the space and the exterior surface of at least one of said sheets to bias the sheets toward each other to a position where the thickness of the flow passage space is established by said spacer means,
collector inlet means located at the upper end of the sheets for introducing heat-receiving liquid into said flow passage space,
collector outlet means located at the lower end of the sheets for collecting heat-receiving liquid discharged from said flow passage space,
said means for maintaining a pressure differential including fluid supply means and fluid discharge means, said fluid discharge means being connected to the collector outlet means and containing liquid which is at atmospheric pressure at a given elevation below the collector outlet means, said fluid supply means supplying fluid at subatmospheric pressure to said collector inlet means.

2. The system of claim 1 wherein the thickness of said flow passage space is no greater than about 0.04 inch to provide in the flow passage space hydrodynamic losses which have an opposite effect on pressure than elevational differences therealong.

3. The system of claim 2 wherein said spacer means is not attached to at least one of said sheets, and said sheets are free to move apart to increase the thickness of said flow passage space, whereby said system is not permanently damaged by excessive flow or expansion due to freezing.

4. The system of claim 2 wherein the spacer means is a plurality of projections integral with and raised from at least one of said sheets.

5. The system of claim 2 wherein at least one of the sheets has a thickness no greater than about 0.010 inch.

6. A solar collector system, comprising,
a pair of substantially parallel sheets which have interior and exterior surfaces, said interior surfaces facing each other and being spaced apart to provide therebetween a flow passage space,
spacer means for limiting the movement of said sheets toward each other, and means for maintaining a pressure differential between the space and the exterior surface of at least one of said sheets to bias the sheets toward each other to a position where the thickness of the flow passage space is established by said spacer means.

collector inlet means located at one end of the sheets for introducing heat-receiving liquid into said flow passage space, collector outlet means located at the other end of the sheets for collecting heat-receiving liquid discharged from said flow passage space, said means for maintaining a pressure differential including fluid supply means for supplying fluid at subatmospheric pressure to said collector inlet means, a liquid seal for receiving heat-receiving liquid from the collector outlet means, said liquid seal being a loop seal means which leads liquid downwardly to an area of pressure greater than atmospheric pressure and then upwardly to a loop seal discharge point which is at atmospheric pressure and is located at an elevation below the collector outlet means and below the collector inlet means.

7. A solar collector system, comprising, a pair of substantially parallel sheets which have interior and exterior surfaces, said interior surfaces facing each other and being spaced apart to provide therebetween a flow passage space, spacer means for limiting the movement of said sheets toward each other, and means for maintaining a pressure differential between the space and the exterior surface of at least one of said sheets to bias the sheets toward each other to a position where the thickness of the flow passage space is established by said spacer means, collector inlet means located at one end of the sheets for introducing heat-receiving liquid into said flow passage space, collector outlet means located at the other end of the sheets for collecting heat-receiving liquid discharged from said flow passage space, a fluid discharge means connected to the collector outlet means and containing liquid which is at atmospheric pressure at a given elevation below the collector outlet means, said means for maintaining a pressure differential includes fluid supply means for supplying fluid at subatmospheric pressure to said collector inlet means, said fluid supply means including a supply conduit extending downwardly from said collector inlet means, and means for creating atmospheric pressure in the fluid in said supply conduit at an elevation which is below said collector inlet means and above said given elevation, whereby the fluid pressure at said collector inlet means is subatmospheric.

8. The system of claim 7 wherein said means for creating atmospheric pressure includes a pressure regulator in said supply conduit, said pressure regulator having an outlet pressure which is less than the pressure head created in said supply conduit by the vertical distance between said pressure regulator and said collector inlet means.

9. The system of claim 7 wherein said means for creating atmospheric pressure includes a fluid supply reservoir containing a body of liquid which has a liquid surface at atmospheric pressure at an elevation below said collector inlet means, said conduit having an inlet end in communication with said body of liquid below said liquid surface.

10. The system of claim 9 wherein said fluid supply reservoir is sealed from the atmosphere, an expansible means having one side in communication with said fluid supply reservoir above said liquid surface, said expansible means having another side in communication with the atmosphere.

11. A solar collector system including a solar absorber panel which has an inlet and an outlet, and a circulatory system for circulating liquid at subatmospheric pressure through said absorber panel, said circulatory system including a pump, a supply line leading from the pump to the absorber panel, a reservoir at atmospheric pressure located at a given elevation below said absorber panel, a return line leading downwardly from the absorber panel to the reservoir, said supply line running upwardly from said pump to said absorber panel a distance which produces a negative pressure at the inlet of the absorber panel.

12. The system of claim 11 having a flow throttling means located in the supply line and a flow throttling means located in the return line.

13. The system of claim 12 wherein both flow throttling means are adjustable valves.

14. The system of claim 12 having pressure gages located at the inlet and outlet of the absorber panel for use in adjusting said valves.

15. A method of adjusting a solar collector system having a reservoir at atmospheric pressure, a supply line provided with a first adjustable flow throttling means, a pump having its suction end connected to said reservoir and its discharge end connected to said supply line, a solar absorber panel located at a higher elevation than said reservoir and pump, said solar absorber panel having an inlet and an outlet, said supply line being connected to said absorber panel inlet, a return line connecting said absorber panel outlet to said reservoir and containing liquid which is at atmospheric pressure at a given elevation below said absorber panel outlet, said method being performed by adjusting said first adjustable flow throttling means to provide a negative pressure at said absorber inlet.

16. The method of claim 15 wherein the system has a second adjustable flow throttling means in said return line, said method including the step of adjusting said second adjustable flow throttling means to change the pressure differential between said absorber inlet and said absorber outlet.

* * * * *